Figure 1:
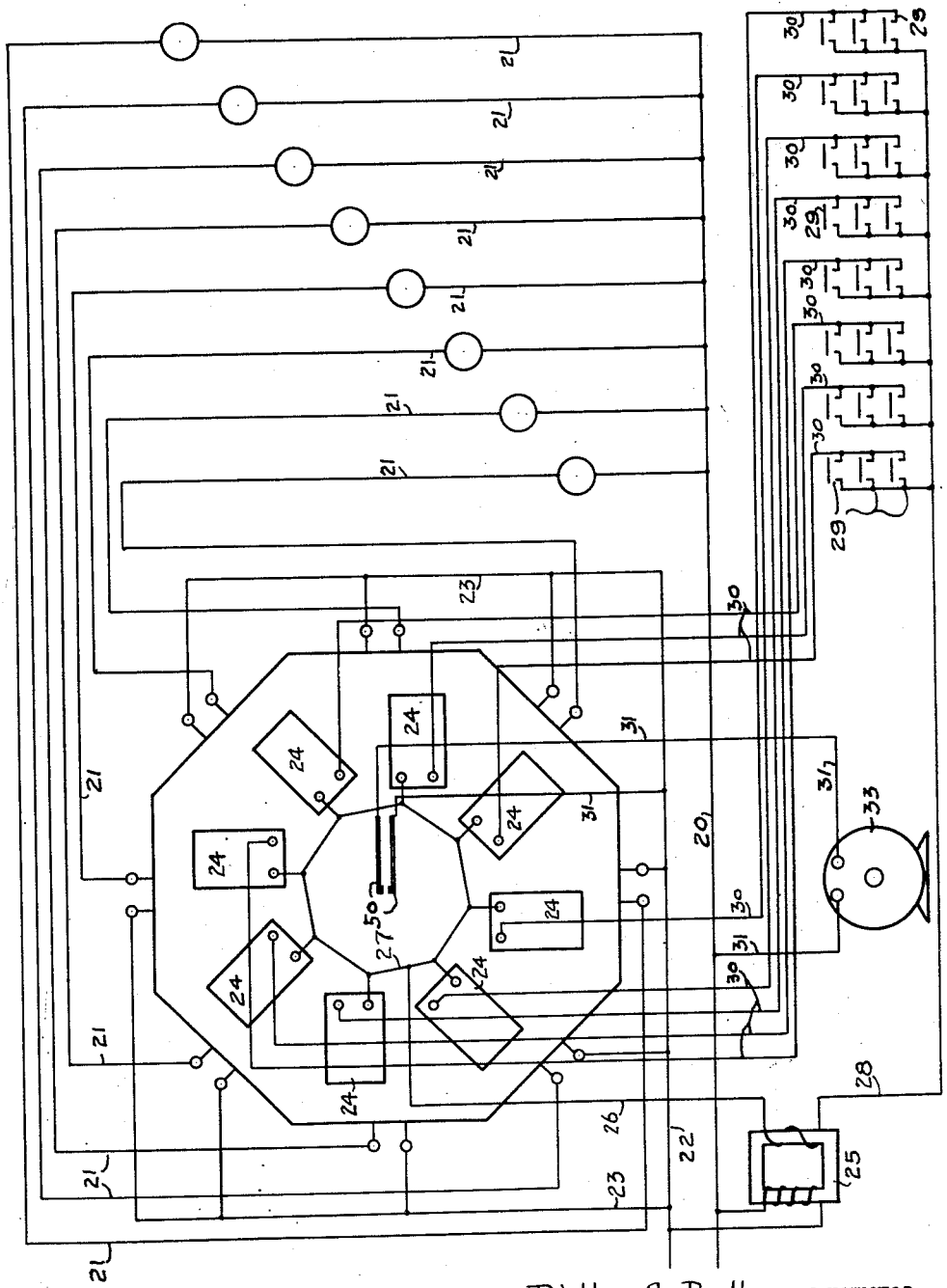

July 15, 1952     B. A. BALL     2,603,729
MULTIPLE DELAYED-ACTION SWITCHES
Filed Nov. 8, 1946     8 Sheets-Sheet 1

Birtley A. Ball    INVENTOR.

BY

*R. J. Elliott*
ATTORNEY

July 15, 1952 B. A. BALL 2,603,729
MULTIPLE DELAYED-ACTION SWITCHES
Filed Nov. 8, 1946 8 Sheets-Sheet 2

INVENTOR.
Birtley A. Ball
BY
ATTORNEY

INVENTOR.
Birtley A. Ball
ATTORNEY

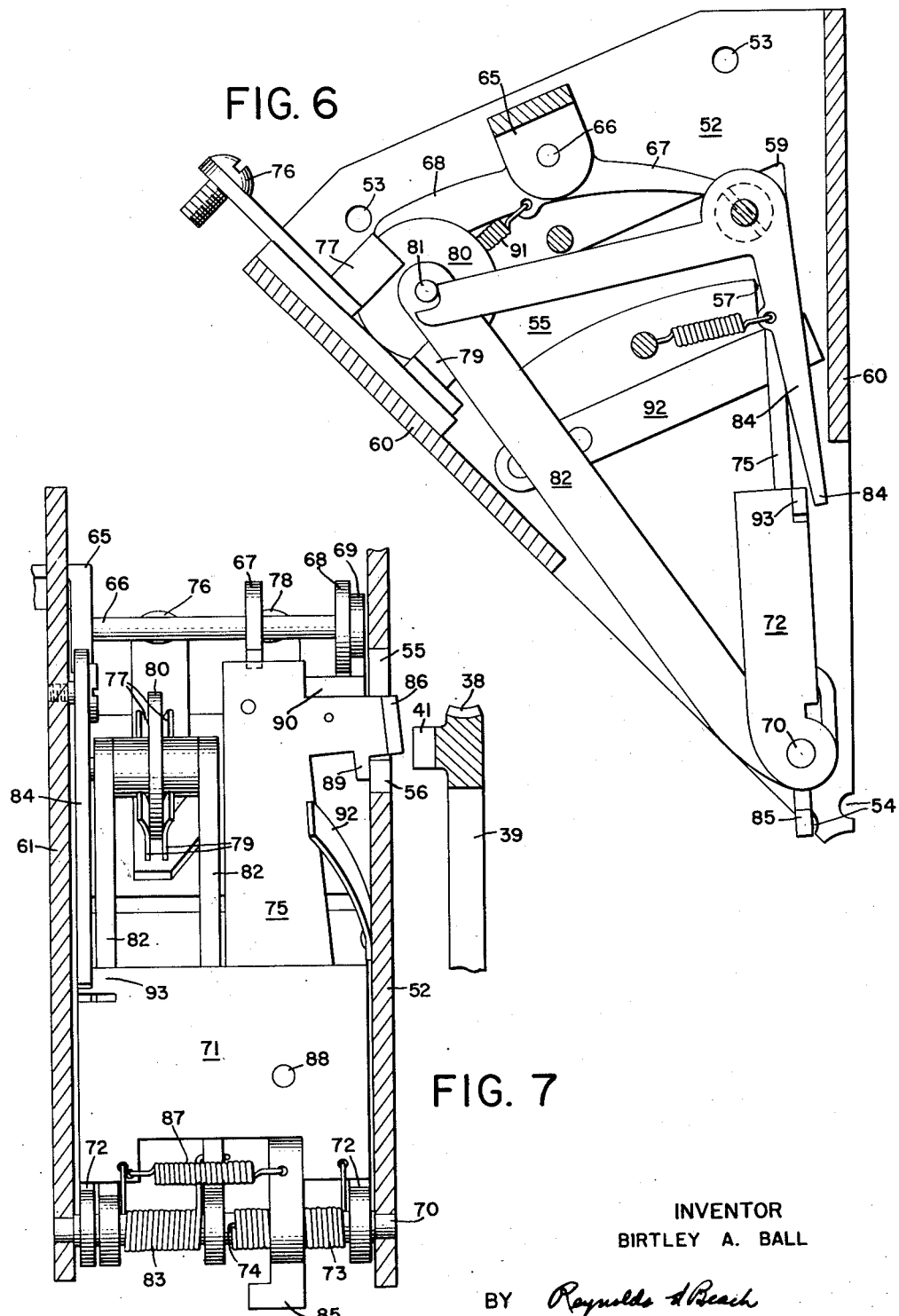

July 15, 1952  B. A. BALL  2,603,729
MULTIPLE DELAYED-ACTION SWITCHES
Filed Nov. 8, 1946  8 Sheets-Sheet 7
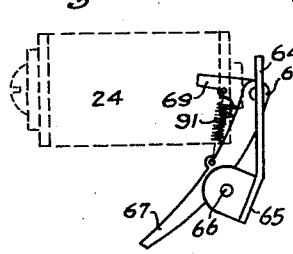
Fig. 9.
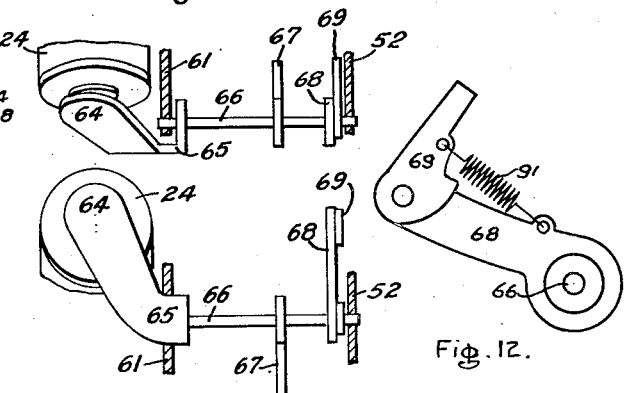
Fig. 11.
Fig. 10.
Fig. 12.
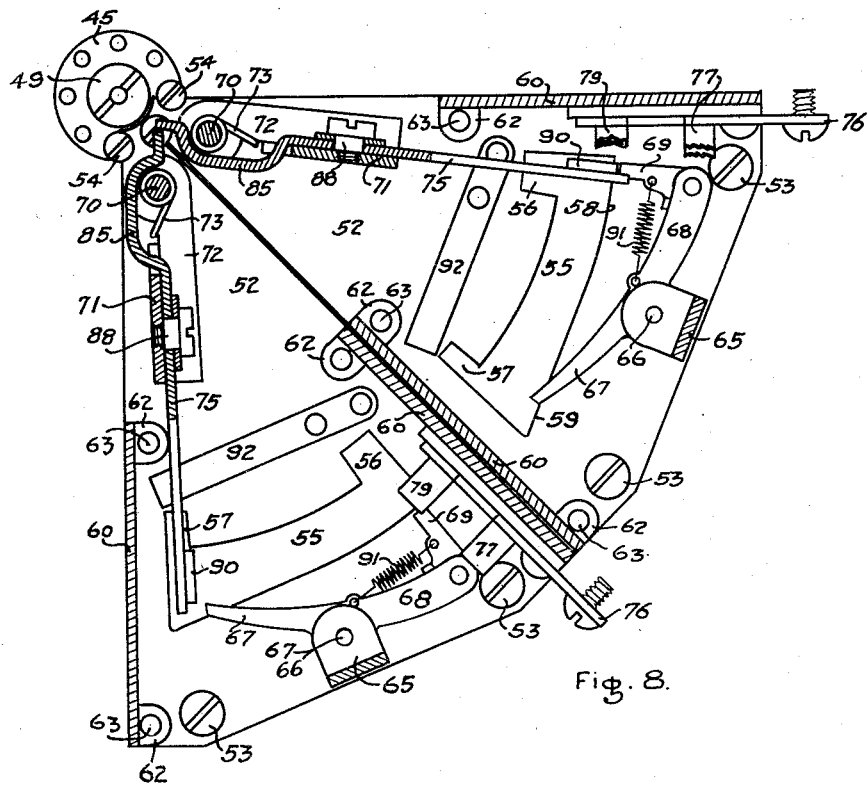
Fig. 8.
INVENTOR.
Birtley A. Ball
BY
ATTORNEY July 15, 1952  B. A. BALL  2,603,729
MULTIPLE DELAYED-ACTION SWITCHES
Filed Nov. 8, 1946  8 Sheets-Sheet 8
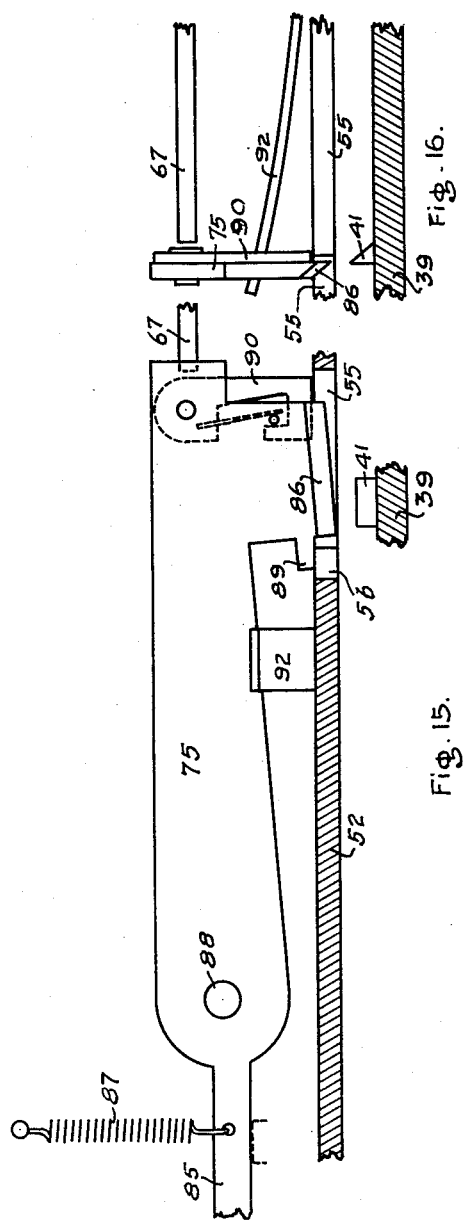
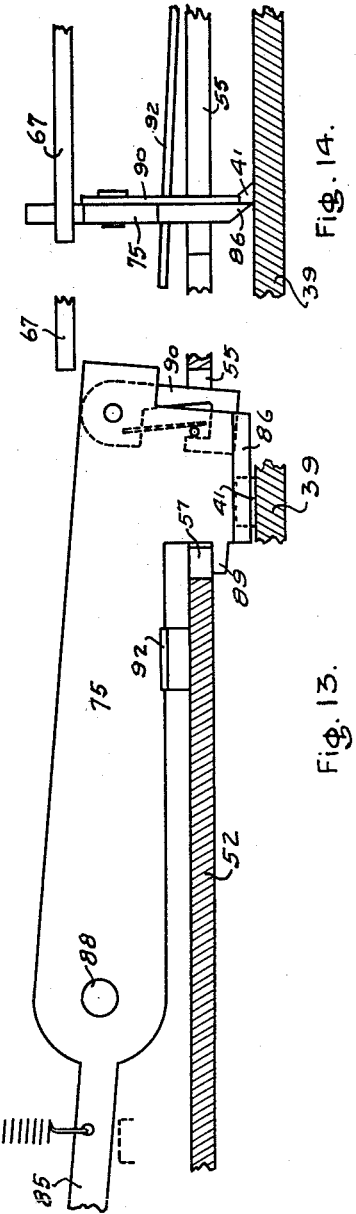
INVENTOR.
Birtley A. Ball
BY
ATTORNEY Patented July 15, 1952

2,603,729

UNITED STATES PATENT OFFICE 2,603,729

MULTIPLE DELAYED-ACTION SWITCHES

Birtley A. Ball, Milton, Wash.

Application November 8, 1946, Serial No. 708,543

26 Claims. (Cl. 200—92)

This invention relates to electric switches, and especially to such switches which are delayed in their action; and also to multiple electric systems in which a plurality of push buttons may be used to control a single circuit, and in which the operation of any one of the same set will close its circuit immediately, and a second operation of any of said buttons will set in motion means by which the said circuit will be opened after a lapse of time.

My invention further consists of a single moving part which is set in motion by a selected one of several control circuits and which operates the mechanism for opening the particular one of a multiple set of electric switches which had previously been closed by the said electric circuit, without opening any of the other switches of the set which may be closed; and which is stopped from further motion when none of the several control circuits has been operated to open its circuit.

The primary object of my invention is to provide a switch which will close instantly when the control circuit is first energized, but which will remain closed for an appreciable time after the second energizing thereof, thus enabling a person in the room to proceed to another room, or pick up clothing, or to get into bed, or to perform any other short action, before the lights are extinguished by the opening of the circuit.

In order to accomplish this primary object I have provided a mechanism and an improved electric circuit in which the main mechanism is operated by remote control; which is inaudible in the room; which may be placed in a separate room, say the basement of a factory, apartment house or of a residence, and which will control all the main circuits of the building, whether said circuits are for a particular room, or for an apartment; in which each element of said control mechanism is controlled from the particular room or apartment by a second circuit, which may be of low voltage; in which such control is effected by any one of a plurality of push buttons in the room or apartment; in which a single operation of said push button will close the switch instantly; and in which the second operation of the same, or another, push button in the same circuit, will set in motion the basement mechanism whereby the closed circuit will be opened after a lapse of time.

Figure 2:
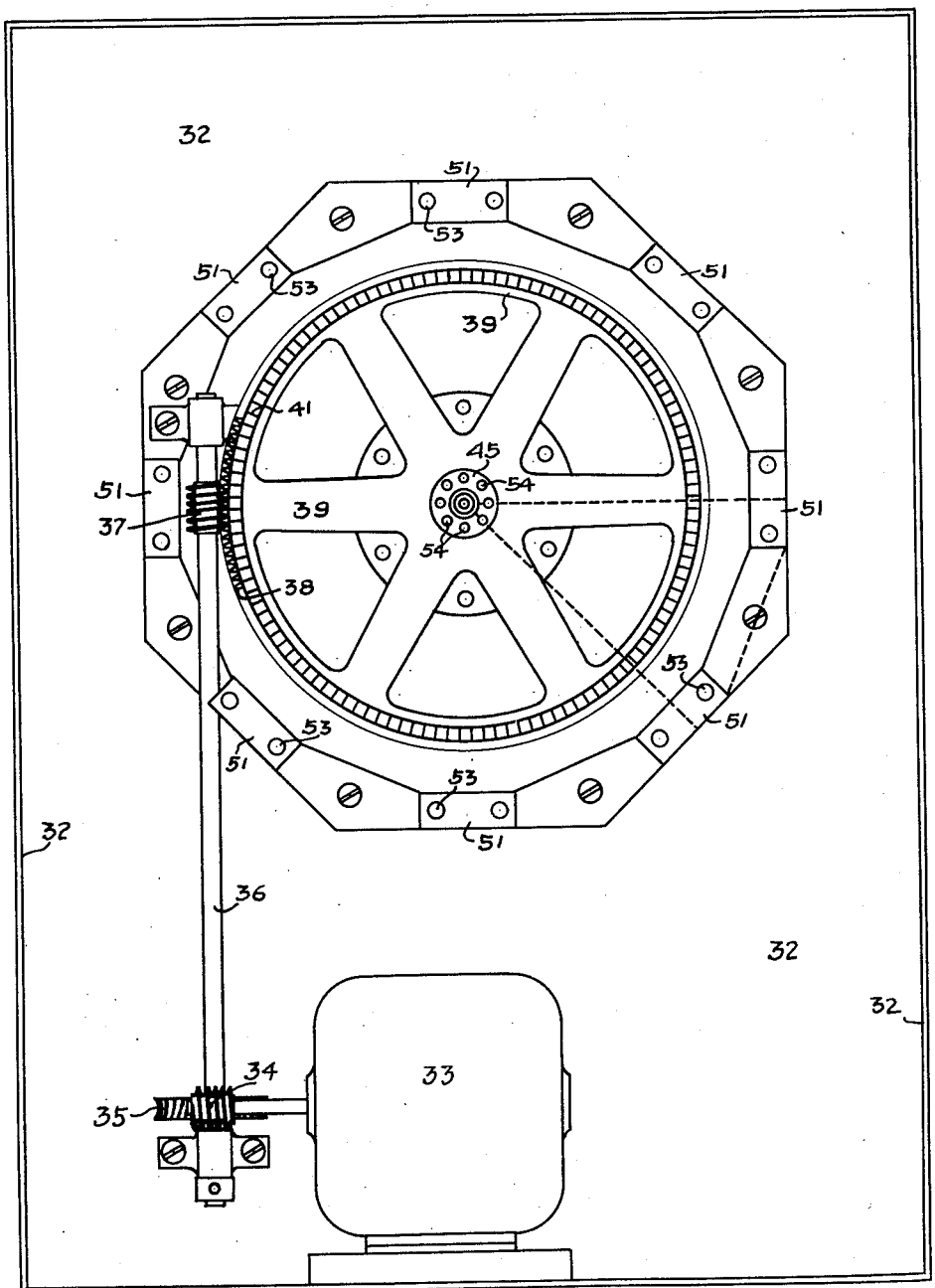
Figure 3:
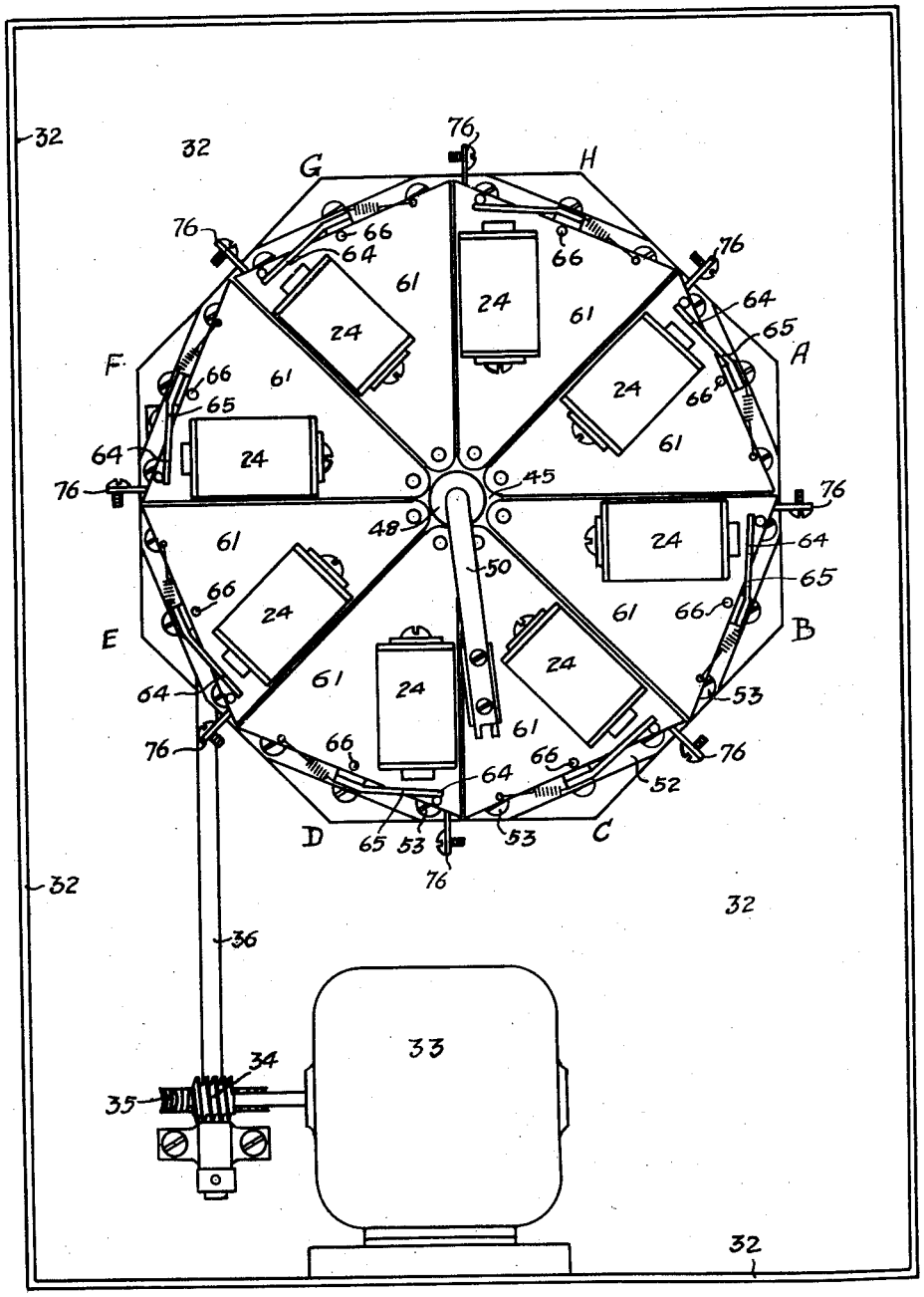
Figure 4:
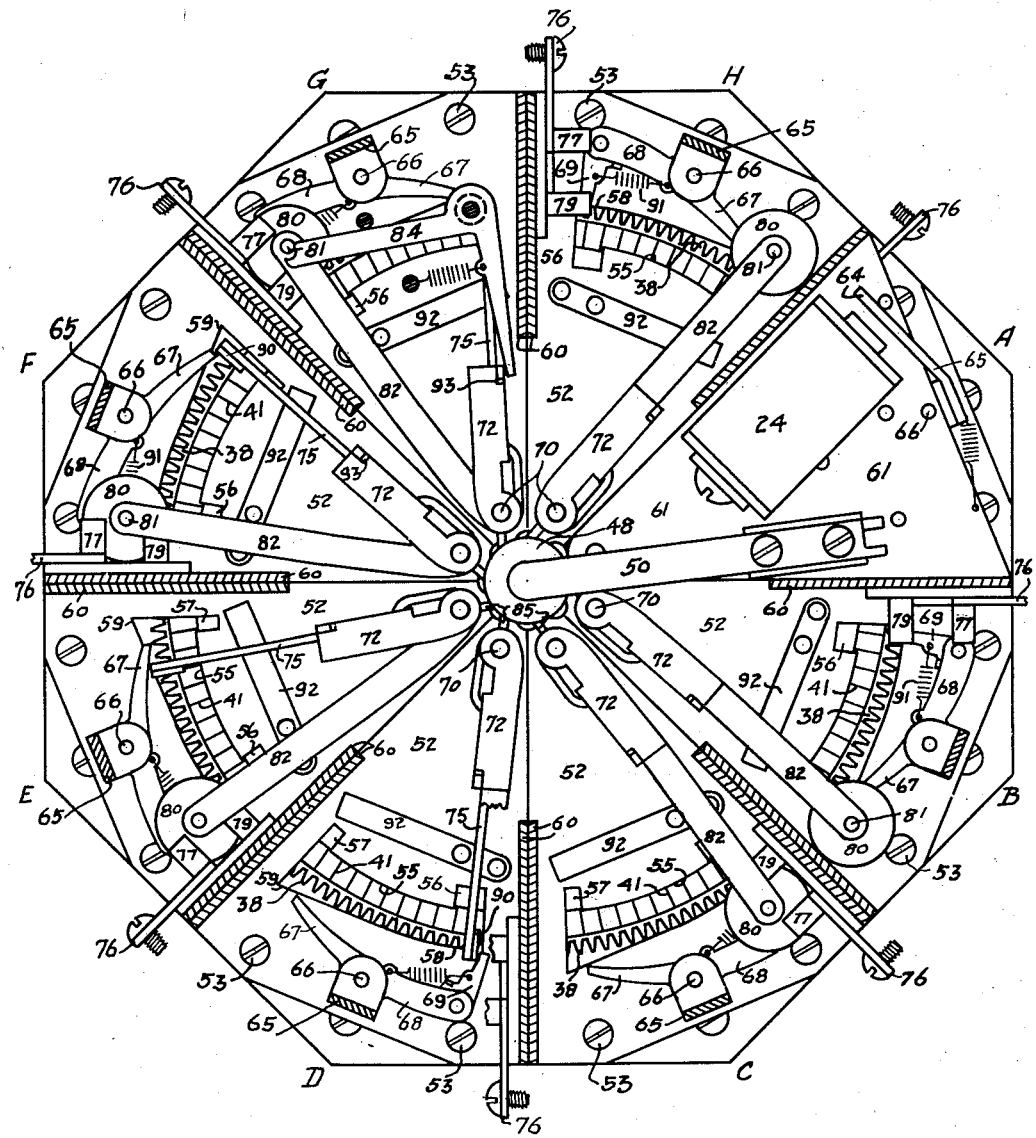
Figure 5:
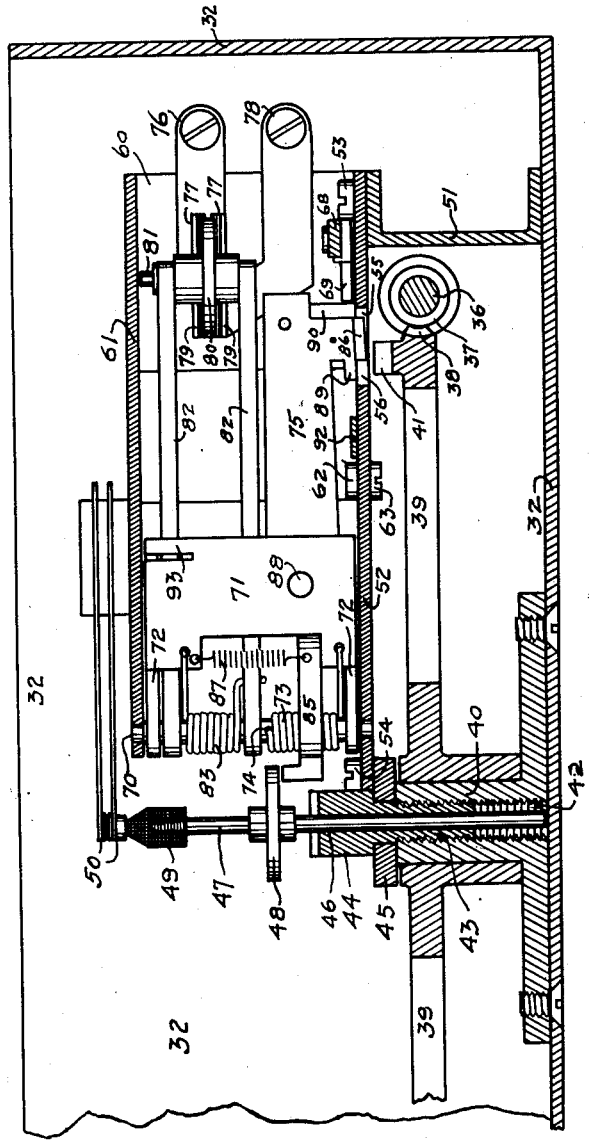

I attain these and other objects, as will readily be apparent to those skilled in the art, by the devices, mechanisms and arrangements illustrated in the accompanying drawings, in which:

Fig. 1 is a diagrammatic view of the electric circuits of my improved switching mechanism, in which eight separate circuits are controlled; Fig. 2 is a plan of the containing box from which all eight of the switch mechanisms are removed; Fig. 3 is a similar view in which the mechanisms are installed, the wiring thereof being omitted; Fig. 4 is a plan of the eight mechanisms from which the cover plates have been removed, and in which the mechanisms show the several switches in different stages of action, and in which parts are broken away to reveal details below; Fig. 5 is a vertical section of one such switch mechanism, showing the parts in the positions occupied when the switch has been turned "on"; Fig. 6 is a plan view of the mechanism used to automatically open the switch, in the position just before the switch is opened; Fig. 7 is a vertical section, in projection thereof; Fig. 8 is a plan view of two adjacent switches showing the operating mechanisms in which one switch is "on" and the other switch is about to be opened; Fig. 9 is a plan view of the trigger mechanism, and Figs. 10 and 11 are projections thereof; Fig. 12 is an enlarged bottom plan view showing the head latch of the trigger; Figs. 13 and 14 are side and end views of the lever, showing it in the position when it is in contact with the driven gear wheel during the interval when the mechanism is in operation to open the switch; and Figs. 15 and 16 are companion views showing it immediately after the circuit is closed, and in its position until the second energization of the control circuit.

Similar numerals of reference refer to similar parts throughout the several views.

Referring, first, to the electric circuits illustrated in diagrammatic form in Fig. 1. One wire 20 of the main primary circuit is common to all branch circuits 21, and the other wire 22 connects with a bus wire 23 which connects to one side of each of the eight individual switches. Each of the several switches is controlled by a separate relay magnet 24, and each relay magnet is operated by a second, or independent circuit which may be energized at low voltage by a battery or by a transformer 25.

Each relay circuit has one wire 26 leading to the bus wire 27 and so to all the magnets 24, and the other wire 28 leads to one or more push buttons 29, located at any convenient place on or out of the room in which that particular main circuit 21 is operating the lights (or other devices or mechanisms), and the other side 30 of the push buttons leads to the other terminals of the respective magnets 24. Any one of these push buttons 29 will control its relay circuit, Also, when any of the push buttons of a particular relay circuit is operated, its action on the main switch for that branch circuit 21 will be either (a) to release the switch arm, which will automatically swing to instantly close the said branch circuit 21, or, if the circuit is already closed, (b) will close the motor circuit 31 which will put in motion mechanism to open the said branch circuit switch after a definite lapse of time has passed after the said push button was pressed.

The mechanism herein shown and described comprises eight identical units (A, B, C, D, E, F, G and H) arranged about a common center and operated by a single motor, but it must be understood that I do not limit myself to this particular form, as the mechanism could be redesigned so that the identical units could be arranged in many other forms to suit the indefinite number of switches it is desired to operate, without departing from the spirit of my invention.

As seen in Figs. 2, 3, and 5, my machine is mounted in a box 32, which may be closed by a glass panel if desired. In this box 32 I mount the electric motor 33, which carries a worm 34, engaging a worm wheel 35 mounted on a counter shaft 36, which also has a worm 37 on its other end, said second worm 37 meshing with the peripheral teeth 38 of a large gear wheel 39. This gear wheel 39 is revolubly mounted on a fixed vertical stub shaft 40 (Fig. 5), in the center of the group of eight units of my mechanisms. The said gear wheel 39 also has a series of radial teeth 41 formed on its upper side. This stub shaft 40 is provided with a screw-threaded hole 42 therein, into which a guide plug 43 is screwed. This plug 43 is provided with a head 44 which clamps a supporting ring 45 between it and the stub shaft 40. A vertical axial hole 46 is made through the plug 43. A vertical rod 47 is slidably mounted in this hole 46. This rod 47 normally rests on the base of the box 32, but is free to be raised by the hereinafter described mechanism.

The rod 47 is provided with a circular flange 48, above the plug 43, and this flange is adapted to be engaged by the hereinafter described parts of any of said unit switches to raise the rod 47 in said guide plug. The upper end of the rod 47 is provided with an insulated cap 49, which is adapted to engage and close contacts between two contact points 50, when it is raised. These contact points 50 are supported from one of the switch units directly above the center of the mechanism and are in the electric circuit 31 which operates the motor 33 so that, when any of the units raises the rod 47, the motor 33 is energized to turn the gear 39 on the stub shaft 40 and so that, when the rod 47 is permitted to drop, the motor circuit 31 is opened and the motor stopped.

The gear wheel 39 and its operating shaft 36 are positioned in the bottom of the box 32 and are surrounded with a series of vertical standards 51 which extend slightly above the radial teeth 41 of the gear wheel.

From here on the description will be of one unit alone, it being understood that each unit is identical with each other unit and that the description applies equally to all of them.

Each unit of the switch is provided with a base plate 52 fastened to the top of the said vertical standards 51, by screws 53, and to the supporting ring 45 by screws 54. These plates 52 fit together to form a cover for the compartment in which the gear wheel works, and each is separately removable therefrom so that any one unit may be removed for repair or adjustment without disturbing the other units of the switch. This is accomplished by disconnecting the several wires therefrom and then removing the four screws 53 and 54 which secure it to the vertical standards 51 and the supporting ring 45. The guide plug 43 and the rod 47 extend upward above the plate 52.

Each of the eight plates 52 is provided with an opening 55, each opening being of special shape (Figure 8) and positioned over the radial teeth 41 of the gear wheel 39. These openings have several functions. In the first place they are generally arcuate in shape and placed so that a portion of the operating mechanism may extend therethrough to engage said radial teeth 41 and to be moved thereby; also the edge nearest the center of the box is arcuate but has a pair of radial inward extensions or slots 56 and 57 at its ends adapted to permit a tongue on the operating mechanism to pass through the said slots 56 and 57 so that it may ride on top of or under the said arcuate edge as the mechanism is moved in one or the other direction, in its oscillating movement; the outer edge of the opening 55 is arcuate at the beginning 58 (considering the direction of motion of the gear wheel 39) and tangential at 59 at the end thereof (upper plate, Figure 8). The centers of the several openings are substantially at the central radius of each unit.

In this case the shape of the unit is a sector of an octagon. The side walls 60 bounding the sector are formed integral with the cover plate 61, and this cover plate 61 supports the relay magnet 24 above referred to as controlling the mechanism and operated by the particular secondary circuit 30 controlled by the push buttons 29 thereof. Also the electric contacts 50, above referred to, are mounted on one of the cover plates 61, selected arbitrarily, and extend over the central insulated cap 49 of the rod 47, above described, and the wires 31 of the motor 33 are suitably secured thereto. The lower edge of the sides 60 are provided with lugs 62 and are secured to the base plate 52 by screws 63 passing upward from the under side of the plate 52 (Fig. 5).

I mount all the operating parts of the individual switch mechanisms for the separate control circuits between the lower plates 52 and the cover plates 61.

Referring particularly to Figs. 9-12, in which the trigger mechanism is illustrated, it will be seen that an armature 64 is mounted on an arm 65 and is maintained adjacent to the magnet 24. The arm 65 extends over the edge of the cover plate 61 and is secured to a vertical pivot rod 66 mounted between the plates 52 and 61. This rod 66 is provided with two arms 67 and 68 secured thereto. The tail arm 67 is secured above the end of the pivot rod 66 and extends toward the "off" side of the switch and is adapted to swing over the end of the opening 55 and to block the movement of the hereinafter described control lever 75 until the magnet 24 is first energized when it releases the lever.

The head arm 68 is secured to the pivot rod 66 near its lowest point and extends in the opposite direction from the tail arm 67, to a point opposite the beginning of the opening 55. This head arm 68 is provided with a horizontal trip 69 pivoted to its extremity and extending substantially at right angles therefrom and has a limited spring resisted motion thereon, and is adapted to resiliently engage the vertical latch on the operating lever, hereinafter described.

In the apex of each sector I mount a fixed nonrotating pivot pin 70 on which the several hereinafter described arms pivot. A vertical swinging plate 71, having the two extreme horizontal arms 72 mounted on the said pivot pin 70, swings freely thereon. This plate 71 is urged in a horizontal direction, counter to the direction of motion of the above described gear wheel 39, by means of a spring 73 wound on the pin 70 and having one end secured thereto by being passed through a hole 74 therein and the other end engaging the lower arm 72 of the swinging plate 71. The spring is tautened when the plate is moved by and with the gear wheel 39.

The swinging plate 71 carries a lever 75 pivoted thereto about a pivot 88 (Figure 7) and adapted to move thereon in a vertical plane. The functions and details of this lever 75 will be described below.

The electric wire 20, forming one side of the main circuit, leads to all the branch circuits 21 and each said branch circuit leads to its respective switch, being secured to the terminal 76 mounted on, but insulated from, one of the side walls 60 of the particular sector. Referring particularly to Figures 1, 5, 6 and 7, this terminal is provided with a pair of suitable horizontal contact clips 77. The other wire 22 of the main circuit leads to the bus wire 23 which is connected to the other terminal 78. This terminal 78 is also mounted on, but insulated from, the same wall 60 of the sector, and is provided with another similar contact clip 79. These contact clips 77 and 79 are each composed of springy tines, one above the other, and are separated by a suitable space so that when the switch disk 80 is placed between them the terminals are electrically connected together.

The switch disk 80 comprises an insulated metal disk adapted to make contact between the tines of both said terminal contact clips 77 and 79, and is revolubly mounted on a vertical pin 81, which is carried on the outer ends of a pair of arms 82. These arms 82 are mounted at their other ends on the above described pivot pin 70, between the arms 72 of the swinging plate 71, and above the spring 73. The switch arms 82 are urged in the direction of motion of the gear wheel 39 by means of a spring 83 whose ends are secured respectively to the swinging plate 71 and to one of said arms 82, in such manner as to be tautened by the motion of the plate 71 with the gear wheel 39 when the arms 82 are held from motion.

The switch arms 82 are moved, to bring the disk 80 into contact with the insulated terminal contact clips, by swinging plate 71 which engages both said arms 82, and which is moved by the spring 73. Thus when the plate 71 is released from its "off" position, the tautened spring 73 forces it and the arms 82 in a direction counter to that of the gear wheel 39 and carries the switch disk 80 between the jaws of the terminal clips 77 and 79, thus completing the controlled circuit.

The plate 71 is held in its normal "off" position by means of the tail arm 67 engaging the end of the lever 75, pivoted to the plate 71, so that when the electro-magnet 24 is energized the tail arm 67 is removed from holding the swinging plate 71, permitting it to swing under the action of the spring 73 to bring the disk 80 into engagement with the terminal contact clips.

When the disk 80 is in this contacting position, it is held there against the action of the spring 83 (if the swinging plate 71 retraces its motion) by means of the end of the bell-crank lever 84 (Figs. 6, 7) pivoted to the cover plate 61 and engaging the pin 81 on which the disk is mounted, and cannot be moved therefrom to open the switch until the bell-crank lever 84 releases it, as hereinafter described.

As above mentioned, the swinging plate 71 carries the lever 75 pivoted to it and movable thereon in a vertical plane. The tail end 85 of this lever is bent around the pivot pin 70 and extends under the above described circular flange 48 of the vertical central rod 47, which operates the switch 50 in the motor circuit, so that the raising of the tail 85 of the lever 75 will start the motor 33 running and the motor will continue to run so long as the flange 48 is held in raised position by any of the eight levers in the set.

The outer end of this lever 75 is provided with a tooth 86 extending down from its lower edge and adapted to pass through the arcuate opening 55 in the plate 52, and to engage one of the radial teeth 41 of the gear wheel 39. The downward motion of the outer end of the lever 75 is caused by a tautened spring 87 mounted between the upper part of the swinging plate 71 and the lever 75, on the tail side of the pivot 88 connecting the lever to the swinging plate.

A tongue 89 which extends downward from the lever 75 at a point above the said tooth 86, is adapted to pass through either one of the slots 56 or 57, extending from the opening 55 in the plate 52 and, between the slots, to ride along the upper side of said plate 52 to hold the tooth 86 out of engagement with the radial teeth 41 of the gear wheel 39, or to ride below said plate 52 to hold said tooth 86 down in engagement with said radial tooth.

A vertical latch 90 is pivotally mounted on the outer end of the lever 75 and hangs down therefrom so as to ride on the upper side of the plate 52 at the arcuate portion 58 of the outer rim of the opening 55 in the plate, thus holding the lever 75 up even after the tongue 89 has passed over the slot 56 of the opening, until said vertical latch 90 is moved inward by the motion of the above described trip 69, when the lever 75 falls and the tooth 86 is engaged by the radial tooth 41 of the gear wheel 39.

The head arm 68 of the trigger is provided with a pivoted horizontal trip 69 which moves therewith and which is adapted to engage the lower end of the outer edge of said vertical latch 90 so that when the relay magnet 24 is energized the said trip 69 will move the vertical latch 90 off from the plate 52 and into the opening 55. The horizontal trip 69 has a limited motion and is held by a spring 91 into engagement with the face and edge of the latch 90 when the lever 75 reaches the closed position of the switch.

An inclined flat spring 92 is fastened to the plate 52 under the course of the lever 75 in such position that the lever 75 does not touch it when the lever is in the closed position of the switch, but rides on said spring 92, depressing it down towards the plate 52 as the said lever 75 is moved by the gear wheel 39 to the open position of the switch, thus when the lever has traveled from closed to open positions and the tongue 89, which is riding under the plate 52, reaches the slot 57 in the plate 52, the flat spring 92 forces the lever 75 upward and breaks the connection of the tooth 86 with the radial tooth 41 and simultaneously lowers the rod 47 to open the contacts 50 to break the electric circuit 51 and stop the motor.

All this time, while the above described lever 75 and the swinging plate 71 are being carried back to the "off" position by the gear 39, the switch disk 80 has continued in contact with the terminal clips 77 and 79 so that the circuit controlled thereby has remained closed, the said disk 80 being held, against the action of the spring 83 which has been tautened by the said motion of the plate 71, by one end of the bell-crank lever 84 engaging the pin 81 of the arm 82 to prevent its movement. But the swinging plate 71 is provided with an adjustable tongue 93, at its outer upper corner, which engages the other end of the bell-crank lever 84 when the swinging plate 71 has nearly reached the extreme "off" position. This tongue 93 swings the bell-crank lever 84 sufficiently to remove its end from blocking the arm 82, thus releasing the arm and causing it to move, under the action of the tautened spring 83, to break the circuit 21 and return it to its normal "off" position, in which it is held until again moved by the released swinging plate 71.

Summarizing the above and referring to Fig. 4, in which all eight units are partially illustrated in different positions: The unit marked "A" shows a plan of the unit above the cover plate 61 showing the relay magnet 24 and its armature 64. In unit "B" the cover plate 61 is broken away and all the parts of the mechanism are in "off" positions, ready to be released into the "on" position. In unit "C" the parts have moved to the "on" position in which the disk 80 is in electrical contact with both contact clips 77 and 79 and the circuit controlled thereby is closed.

In moving from the position shown in "B" to that in "C" the relay magnet has been energized and has drawn the armature 64 towards it, thus moving the tail arm 67 of the trigger out of blocking position and thus releasing the lever 75 and the swinging plate 71 so that they move under the action of the spring 73. This spring 73 has previously been tautened by the motion of the parts under the action of the gear wheel 39. The motion of the plate 71 carries the switch arms 82 with it until the disk 80 engages the contact clips 77 and 79.

In unit "D" portions have been broken away to show the horizontal trip 69 of the trigger head arm 68. In this case it is assumed that the push button 29 has not been released before the lever 75 and its latch 90 have swung into "on" position, and shows that the latch 90 has pushed the trip 69. As soon as the push button is released the arm 68 of the trigger will draw the trip back to engage the edge of the latch 90.

In unit "E" the relay magnet has again been energized and has actuated the trigger head arm 68 and its trip 69 to push the end of the latch 90 over the edge 58 and into the opening 55. This has resulted in the dropping of the outer end of the lever 75, under the action of the spring 87, thus bringing the tooth 86 into engagement with the radial teeth 41 of the gear 39. The dropping of the outer end of the lever 75 has raised its tail 85 and this movement has raised the rod 47 to close the motor circuit, thus starting the gear wheel 39 and moving the lever 75 and the swinging plate 71 towards the starting or "off" position and again tautening the spring 73. The disk 80 remains engaged with switch contact clips 77 and 79 during this return movement of lever 75.

As the lever 75 moves toward the "off" position it is held down by the tongue 89, which has passed through the slot 56 and which engages the under side of the plate 52, the lever 75 moving against the action of the spring 92, thus forcing this spring downward as it moves toward the "off" position. As the lever 75 approaches the end of its travel, it engages the tail arm 67 of the trigger and swings the trigger on its pivot to allow the lever to pass.

In units "F" and "G," which illustrate substantially simultaneous actions, the lever 75 has reached the slot 57 of the opening 55 thus disengaging the tongue 89 from the plate 52. At about the same instant the adjustable tongue 93, on the swinging plate 71, has engaged and moved the end of the bell-crank lever 84 to move it away from the pin 81 of the disk 80 and releases the arm 82 thereof, to start swinging away from the "on" position, under the action of the spring 73, thus removing the disk 80 from the contacts 77 and 79 and opening the circuit 21 which has been controlled by the two consecutive pressings of the push button 29. Initiation of operations starting the return movement of lever 75 thereby marks the beginning of the switch-opening delay period of the mechanism, while swinging of bell-crank 84 to relieve the pin 81 marks the end thereof, the arm 82 returning rapidly under force of spring 73.

The rapidly moving arm 82 hits the swinging plate 71 a sharp blow which is transmitted to the lever 75 and to its tooth 86, thus relieving the pressure of the radial tooth 41 thereon, and permitting the flat spring 92 to raise the lever 75, since the tongue 89 has already reached the radial slot 57. The raising of the lever 75 has lowered its tail 85, thus lowering the rod 47 (unless it is held up by some other switch) and opening the circuit 31 to stop the motor 33.

In unit "H" the parts have again returned to the normal "off" position, as shown in unit "B."

It is, of course, to be understood that many changes may be made in the above-described mechanism, which is shown and described as merely one way in which the objects of my invention may be attained, without departing from the spirit of my invention as outlined in the appended claims.

What I claim and desire to secure by Letters Patent, is:

1. Electric switching mechanism comprising an electric motor; a wheel actuated thereby; a plurality of electric switches arranged around the central axis of said wheel; a central contact switch operable to control energization of said motor; means controlled by each of said electric switches and operable to actuate said central switch for energization of said motor; and means in each of said electric switches, operated by said wheel and operable to open said central switch to stop said motor, when the wheel has turned a predetermined distance and when said first means of all said electric switches is inactive.

2. Electric switching mechanism comprising an electric motor; a plurality of electric switches arranged around an axis; a central contact switch operable to control energization of said motor; and means, operated by each of said electric switches to close said central switch for energization of said motor when any one of said electric switches operates said means.

3. Electric switching mechanism comprising an electric motor; a wheel actuated thereby; a plurality of electric switches arranged around the central axis of said wheel; a lever in each said switch adapted to releasably engage said wheel and to be moved thereby; a vertically movable rod mounted generally along the axis of said wheel and having a circular flange thereon; a tail to said lever in each switch, adapted to engage and shift said flange and rod axially when the lever is in engagement with said wheel; and a motor-controlling contact switch connected to said motor and adapted to be engaged and closed by said rod when it is thus shifted by said lever, for energization of said motor when any of the levers of the several switches is in engagement with said wheel.

4. An electric switch comprising, in combination, a pair of make-and-break terminals therein adapted for connection to one side of an electric circuit; an arm pivoted in said switch and carrying a contact member adapted to make contact with both said terminals to effect closure of said circuit; a plate concentrically pivoted with said arm and lying on the "off" side of said arm; a spring engaging said plate and urging it against said arm to swing said arm to make said contact; a trip adapted to releasably hold said plate from swinging on its pivot to force said arm to make said contact; and means adapted to operate said trip, whereby when said trip is actuated, said plate and arm are swung by said spring to make said contact.

5. An electric switch comprising, in combination, a pair of make-and-break terminals adapted for connection to one side of an electric circuit; an arm pivoted in said switch and carrying a contact member adapted to make contact with both said terminals to effect closure of said circuit; a plate concentrically pivoted with said arm and lying on the "off" side of said arm; a spring between said arm and said plate urging them towards each other; means pivoted in said switch and operable to releasably hold said arm in contacting position; a rotating wheel; means mounted on said plate to releasably engage said wheel, whereby said plate is drawn away from said arm, against the tautening of said spring; and means on said plate operable to engage and release said holding means when said plate has moved a predetermined distance, whereby said arm is moved out of said contacting position, to effect opening said circuit, by said tautened spring.

6. An electric switch as set forth in claim 5, wherein the means to releasably engage the wheel comprises a lever pivoted to the plate and moving therewith; a spring adapted to move the lever into contact with teeth on said wheel, whereby said lever and plate are moved by said wheel away from the arm; a fixed plate lying parallel with said wheel; an arcuate opening in said plate wherein said lever travels when in engagement with said wheel; a tongue on said lever and operable to ride under said plate at the edge of said opening to maintain said lever in engagement with said wheel; a slot leading radially from said opening and in line with said tongue whereby the lever is free to be released from said wheel when it has moved a predetermined distance; and means operable to raise said lever away from said wheel, when said lever tongue is in said slot.

7. An electric switch as set forth in claim 5, wherein said means to releasably engage the wheel comprises a lever pivoted to the plate and moving therewith; spring means operable to move said lever into contact with teeth on said wheel, whereby said lever and plate are moved by said wheel away from said arm; means operable to maintain said lever in engagement with said wheel; and means to break said engagement after said lever has moved a predetermined distance.

8. An electric switch as set forth in claim 5, wherein the means to releasably engage the wheel comprises a lever pivoted to the plate and movable therewith; a spring adapted to move the lever into contact with teeth on said wheel, whereby said lever and plate are moved by said wheel away from the arm; a fixed plate lying parallel with said wheel; an arcuate opening in said fixed plate wherein said lever travels when in engagement with said wheel; a tongue on said lever and operable to ride under the plate at the edge of said opening to maintain said lever in engagement with said wheel; a slot leading radially from said opening and in line with said tongue whereby the lever is free to be released from said wheel when it has moved a predetermined distance; and an inclined flat spring, mounted between said fixed plate and said lever, adapted to be depressed by said lever as it moves towards the slot, whereby said lever is raised out of engagement with said wheel.

9. An electric switch as set forth in claim 5, wherein the holding means comprises a lever engaging the end of the arm when it is in contacting position; and wherein the means operable to engage and release said holding means comprises an adjustable tongue extending from the plate and operable to engage said lever to release said arm therefrom to open the switch.

10. An electric switch comprising, in combination, a pair of make-and-break terminals adapted for connection to one side of an electric circuit; an arm pivoted in said switch and carrying a contact member adapted to make contact with both said terminals to close said circuit; a plate concentrically pivoted with said arm and lying on the "off" side of said arm; a first spring between said arm and said plate urging them towards each other; a second spring engaging said plate and urging it against said arm to swing said arm to make contact and close said circuit; a trip mounted in said switch and engaging said plate to hold it and the arm in open position against the action of said second spring; means operable to move said trip from such engaging position to release the plate and the arm to make such contact and close said circuit; a rotating wheel; a lever pivotally mounted on said plate and adapted to engage said wheel; a third spring between said plate and said lever adapted to bring said lever into engagement with said wheel; a latch mounted on said lever and operable to hold said lever against the action of said third spring; a second trip operable to engage the latch to release said lever into engagement with said wheel, both said trips being actuated by the same means and to be alternately effective; means pivoted in said switch and operable to releasably hold said arm in said contacting position against the action of said first spring, which is tautened by the motion of said plate with said wheel; and means on said plate operable to engage said releasable holding means when said plate has moved a predetermined distance.

11. An electric switch comprising a lever pivoted in the switch; a spring engaging said lever to move it on its pivot; a latch on one end of said lever and operable to hold said lever in normal position against the action of said spring; an electromagnet; a trip actuated by said electromagnet and operable to push said latch for releasing the lever for movement by said spring; an electric motor; a motor-control contact switch in circuit with said motor; a slidable rod adapted to close said contact switch when moved; and a tail on the other end of said lever engaging said rod for switch closing movement thereof by spring-urged movement of said lever, to energize said motor.

12. An electric switch as set forth in claim 11, together with a toothed wheel driven by said motor; a tooth on said lever adapted to engage the teeth of said wheel to swing said lever with rotation of said wheel; a pair of switch terminals to be controlled by the electric switch; an arm pivoted in said electric switch and carrying a contact member adapted to make contact with both said terminals; a second spring connecting said lever to said arm and tautened by the movement of said lever under the action of said wheel; means operable to hold said arm against the action of said second spring; means mounted on the lever, operable to release said arm from said holding means when said lever has moved a predetermined distance; and means operable to remove said tooth from said wheel and simultaneously to return said tail, to open said motor circuit and stop the motor.

13. Electric switching mechanism comprising a plurality of circuit-controlling electric switches having initial positions; a single rotating electric motor; a moving mechanism operated thereby common to said switches; individual remote-controlled actuating means for each of said switches operable to actuate its switch to an alternate position; and remote-controlled drive means in each said switch conditioned by such actuation thereof and including an element releasably engageable with said moving mechanism to return said switch to its initial position by remote-controlled operation of said conditioned drive means.

14. Electric switching mechanism comprising an electromagnet; a circuit-controlling switch adapted for actuation by said electromagnet, said switch including a spring-urged switching element and a control element normally blocking spring-impelled movement of said switching element but actuated by energization of said electromagnet to release said switching element for such movement, and motive-power mechanism including movable drive means energizable by a second energization of said electromagnet, and means interconnecting said drive means and said switching element and operable to return said switching element to its initial position automatically by predetermined movement of said drive means following the said second energization of said electromagnet.

15. Electric switching mechanism comprising a plurality of electromagnets; a plurality of circuit-controlling switches adapted for actuation by said electromagnets, respectively, each such switch including a spring-urged switching element and a control element normally blocking spring-impelled movement of said switching element but actuated by energization of its electromagnet to release said switching element for such movement, and motive-power mechanism including movable drive means common to said switches and energizable by a second energization of any of said electromagnets, and means in each switch interconnecting said drive means and the switching element of such switch, and operable to return said switching element to its initial position automatically by predetermined movement of said drive means following the said second energization of said electromagnet.

16. An electric switch comprising a lever pivoted in the switch; a spring engaging said lever to move it on its pivot; a latch on said lever and operable to hold said lever in normal position against the action of said spring; an electromagnet; a trip actuated by said electromagnet and operable to push said latch for releasing the lever for movement by said spring; an electric motor; a motor-control contact switch in circuit with said motor; a slidable member adapted to close said contact switch when moved; and a projection on said lever engaging said slidable member for switch closing movement thereof by spring-urged movement of said lever, to energize said motor.

17. Electric switching mechanism comprising circuit-controlling switch means having an initial switching position; remote-controlled means including electrically energizable means and switch actuating means controlled thereby to actuate said switch means to an alternate switching position by an initial remote-controlled energization of said electrically energizable means; motive power means adapted to drive said switch means to its initial position; and motive power energizing control means inoperative in the initial position of said switch means but conditioned for operation by such actuation of said switch means, and controlled thereupon by said remote-controlled means to operate said motive power means and return said switch means to its initial position by a second remote-controlled energization of said electrically energizable means.

18. The electric switching mechanism defined in claim 17; wherein the motive power means comprises a power-driven element, a switch-moving member movable thereby, spring means interconnecting said member and the switch means, latch means maintaining said switch means in its alternate switching position during spring-tautening power-driven movement of said member, and latch release means controlled by movement of said switch-moving member and actuated automatically in response to predetermined travel thereof, thereby to release said switch means for spring-impelled movement thereof to its initial position, such latter movement of the switch means being thereby delayed by the time of such travel of said switch-moving member.

19. The electric switching mechanism defined in claim 18; wherein the switch actuating means includes spring means tautened by operation of the motive power means to move the switch means from its alternate to its initial position, further latch means maintaining said switch means in its initial position, and latch release means tripped by remote-controlled energization of said electrically energizable means, thereby to release said switch means for spring-impelled movement thereof to its alternate position.

20. The electric switching mechanism defined in claim 17; wherein the switch actuating means includes spring means tautened by operation of the motive power means to move the switch means from its alternate to its initial position, further latch means maintaining said switch means in its initial position, and latch release means tripped by remote-controlled energization of said electrically energizable means, thereby to release said switch means for spring-impelled movement thereof to its alternate position.

21. Electric switching mechanism for controlling a plurality of electric lighting circuits or the like, comprising a plurality of circuit-controlling switch means each having an initial switching position; individual remote-controlled means for each of said switch means, including electrically energizable means and switch actuating means controlled thereby to actuate its particular switch means to an alternate switching position thereof by initial remote-controlled energization of said electrically energizable means, respectively; motive power means including a power drive element common to all of said switch means, and individual switch return means for each switch means, adapted to be driven by said drive element, and conditioned for driving connection therewith automatically by such actuation of its particular switch means into the alternate position thereof; and motive power control means for each switch means, inoperative in the initial position of such switch means but conditioned for operation by such actuation of said switch means, said control means being operable thereupon by a second remote-controlled energization of said energizable means to effect driving connection of the power drive element and the return means of the particular switch means, thereby to drive said particular switch means to its initial position.

22. Electric switching mechanism defined in claim 21; wherein the motive power means further comprises an electric motor to drive the power drive element, and motor energizing switch means actuated by operation of any of the motive power control means and deactuated by movement of the corresponding switch means to its initial position by the drive element.

23. Electric switching mechanism comprising a plurality of circuit-controlling electric switches having initial positions; electric motor means common to said switches; remote-controlled actuating means for each of said switches, operable to actuate its switch from the initial position to an alternate position thereof; and switch return means for each switch, adapted when actuated to form a driving connection with said motor means and conditioned for such actuation by actuation of the particular switch means into its alternate position; and a return means actuator in each switch controlled by said remote-controlled means and operated by actuation of the latter to effect the driving connection returning its particular switch to the initial position thereof.

24. Electric switching mechanism comprising an electromagnet; a circuit-controlling switch adapted for actuation by said electromagnet, said switch including a spring-urged switching element and a control element normally blocking spring-impelled movement of said switching element, but actuated by initial energization of said electromagnet to release said switching element for such movement; motive-power mechanism including drive means, means conditioned for operation to energize such drive means by such movement of the switching element, and operable to effect such energization thereafter by a second energization of said electromagnet; and means interconnecting said drive means and said switching element for return movement of the latter to its initial position, such interconnecting means including mechanism maintaining such switching element in its alternate switching position during predetermined initial travel of said drive means when energized, and coacting quick-return means actuating such switching element to its initial position automatically upon completion of such travel.

25. Electric switching means defined in claim 24; wherein the maintaining mechanism comprises a latch, and the quick-return means comprises an advance member movable with the drive means, a spring interconnecting such member and the switching element, and a latch release element tripped by movement of the drive means and advance member to release the latch for spring-impelled movement of the switching element to its initial position.

26. Electric switching apparatus comprising circuit-controlling switch means having an initial position; remote-controlled switch-actuating means operable by remote control to actuate said switch means to an alternate switching position; electrically energizable time delay switch-reversing means operable to move said switch means back to its initial position at a predetermined time following initial energization of such reversing means; energizing means conditioned for operation to energize said switch-reversing means by such actuation of said switch means; and means controlled by said remote-controlled switch-actuating means to operate said energizing means and energize said switch-reversing means automatically in response to a second operation of such actuating means, and thereby to return said switch means to its initial position.

BIRTLEY A. BALL.

REFERENCES CITED

The following references are of record in the file of this patent:

UNITED STATES PATENTS

| Number | Name | Date |
|---|---|---|
| 1,761,652 | Chandler | June 3, 1930 |
| 1,866,007 | Bissell | July 5, 1932 |
| 2,073,319 | Rosay | Mar. 9, 1937 |
| 2,125,130 | Schofield | July 26, 1938 |
| 2,182,038 | Soulat | Dec. 5, 1939 |
| 2,194,687 | Biederman | Mar. 26, 1940 |
| 2,275,918 | Newell | Mar. 10, 1942 |
| 2,294,573 | Potter | Sept. 1, 1942 |
| 2,304,606 | Shoemaker et al. | Dec. 8, 1942 |
| 2,304,986 | Young et al. | Dec. 15, 1942 |
| 2,478,407 | Lean | Aug. 9, 1949 |
| 2,481,333 | Newell | Sept. 6, 1949 |